(No Model.)
W. RADAM.
APPARATUS FOR IMPREGNATING LIQUIDS WITH GASES.
No. 412,664. Patented Oct. 8, 1889.
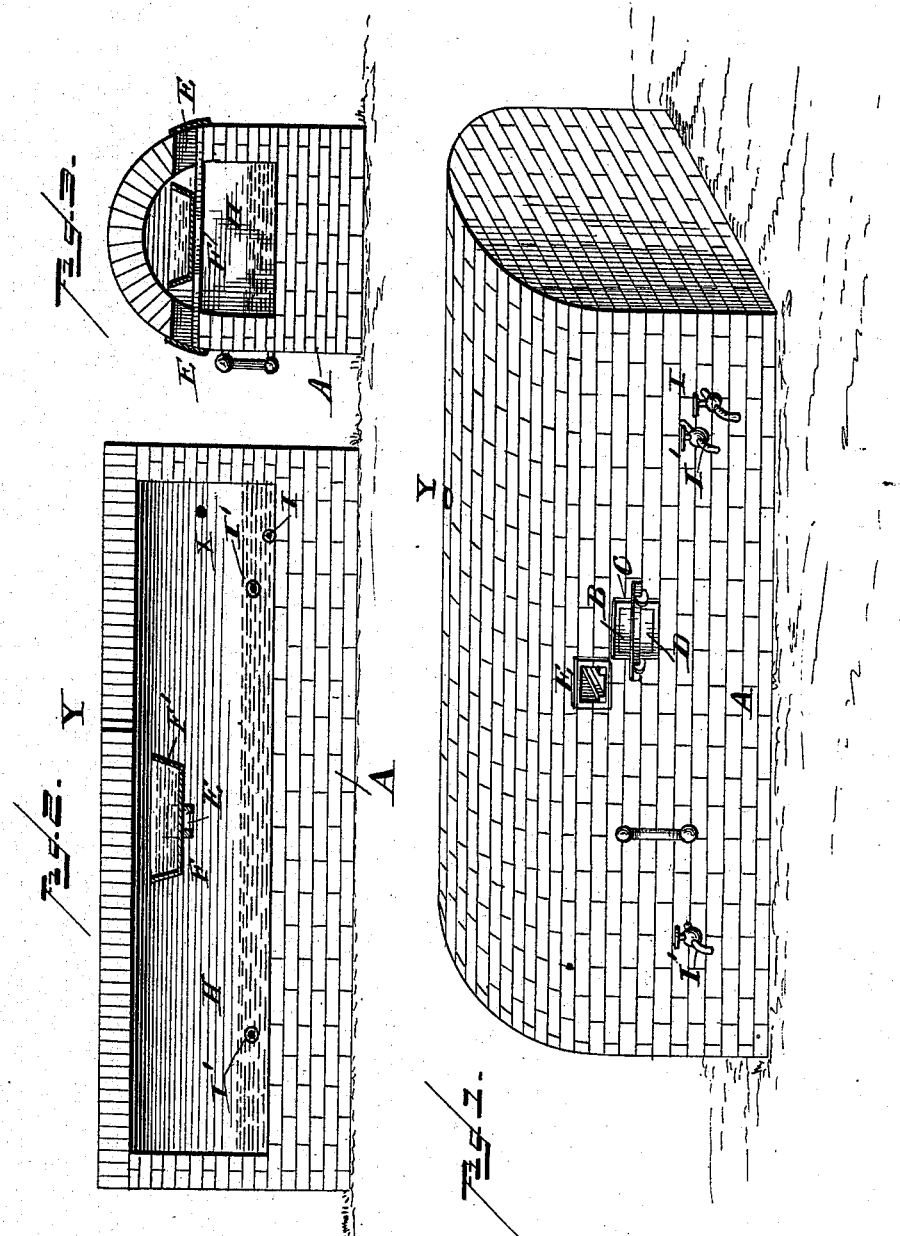

UNITED STATES PATENT OFFICE.

WILLIAM RADAM, OF AUSTIN, TEXAS.

APPARATUS FOR IMPREGNATING LIQUIDS WITH GASES.

SPECIFICATION forming part of Letters Patent No. 412,664, dated October 8, 1889.

Application filed July 15, 1889. Serial No. 317,518. (No model.)

*To all whom it may concern:*

Be it known that I, WILLIAM RADAM, a citizen of the United States, and a resident of Austin, in the county of Travis and State of Texas, have invented certain new and useful Improvements in Apparatus for Impregnating Liquids with Gases; and I do hereby declare that the following is a full, clear, and exact description of the invention, which will enable others skilled in the art to which it appertains to make and use the same, reference being had to the accompanying drawings, which form a part of this specification.

My invention relates to apparatus for impregnating water or other suitable liquid with the fumes emanating from the consumption of a combustible composition of matter, such as sulphur, which when ignited emits a gas containing suitable medicinal qualities; and it consists in the construction and novel combination of parts, as will hereinafter be fully described, and particularly pointed out in the claim.

In the drawings, Figure 1 is a view in perspective of an apparatus embodying my improvements. Fig. 2 is a vertical longitudinal sectional view, and Fig. 3 is a vertical transverse sectional view taken through the view-window and the transverse supporting-joint.

Referring by letter to the accompanying drawings, A designates the foundation of the structure, which is built of brick and cement, the dimensions of which are preferably twelve feet in length, six feet in width, and one foot in height, inside measurement. On this foundation I build a wall of brick and cement, which extends entirely around the foundation-wall, said wall being by preference eight inches thick and three and one-half feet in height, and then arch it over, as shown. In one side of this structure I provide a man-hole B, about eighteen inches by eighteen inches, said man-hole being located about eight inches above the bottom of the tank or interior compartment of the apparatus. The man-hole is preferably a wooden frame C, let into the masonry and closed by a hinged door D, through which when it is necessary a man may enter and clean out the interior of the apparatus.

Upon opposite sides of the tank A and in the same planes is a window E, having a glass cover *e*. Upon the bottom walls of these windows rest the ends of the transverse beam F, upon which the vessel F', which contains the sulphur, is supported in full view of the attendant, who may desire to inspect it through said window. The interior walls of the structure are first thoroughly coated with cement, and then lined with glass, slate, tiles, or the like, no metal, however, being used in the structure, owing to its liability to be affected by the acids generated in using the apparatus.

In the bottom of the tank or reservoir H, I provide a draw-off cock or faucet I, to run off the sediment that settles to the bottom of the tank or reservoir. About one-half inch above the bottom of the reservoir or tank I provide two faucets or cocks I', for drawing off the impregnated liquid into bottles, jugs, or other vessels, ready to be shipped for use. The latter two cocks or faucets are of great importance, as it is necessary to obtain only the clear impregnated water for use. After the clear treated water has been drawn off through the proper faucets the sediment is then washed out through the cock in the bottom of the reservoir, and the apparatus is again ready to be charged with impregnating compound.

The water or liquid is introduced into the tank or reservoir preferably by means of a hose through an opening provided at any convenient point in the apparatus, as at X. The combustible compound is then introduced and ignited and the gas permitted to impregnate the liquid.

The wall of the reservoir or tank is provided with a hole Y, for admitting air to the apparatus when the gas has nearly extinguished the burning compound. I then close the hole Y and the liquid absorbs the gas. In this way I impart a sour acid taste to the liquid in from four to twenty-four hours, according to the strength I desire to attain.

The faucets employed in this apparatus are all of wood.

The dimensions above given may vary to suit the manufacturer. I have only outlined a convenient size for ordinary manufacturing purposes.

Having thus fully described my invention, what I claim as new, and desire to secure by Letters Patent of the United States, is—

In an apparatus for impregnating liquids with gases, the combination, with the closed reservoir A for containing the liquid, having windows E upon opposite walls thereof, of the transverse beam F, having its ends supported in said windows, the sulphur-containing vessel F', resting upon said transverse beam, the man-hole B, the air-hole Y, and cocks I and I', substantially as described.

In testimony that I claim the foregoing as my own I have hereunto affixed my signature in presence of two witnesses.

WILLIAM RADAM.

Witnesses:
LOUIS BAGGER,
AUGUST PETERSON.